United States Patent [19]

Kuroda et al.

[11] Patent Number: 4,740,671

[45] Date of Patent: Apr. 26, 1988

[54] TEMPERATURE CONTROL APPARATUS FOR DETECTING AN ABNORMALITY IN A HEATER IN A COPYING MACHINE OR THE LIKE

[75] Inventors: Kouki Kuroda, Tokyo; Toshiaki Yagasaki, Hino; Tsuneki Inuzuka, Machida, all of Japan

[73] Assignee: Canon Kabushiki Kaisha, Tokyo, Japan

[21] Appl. No.: 925,460

[22] Filed: Oct. 30, 1986

Related U.S. Application Data

[63] Continuation of Ser. No. 614,763, May 29, 1984, abandoned.

[30] Foreign Application Priority Data

Jun. 7, 1983 [JP] Japan ................................ 58-101295
Jun. 7, 1983 [JP] Japan ................................ 58-101296

[51] Int. Cl.[4] .............................................. H05B 1/02
[52] U.S. Cl. ..................................... 217/492; 219/497; 219/508; 219/494; 340/588

[58] Field of Search ............... 219/490, 491, 492, 493, 219/494, 497, 499, 501, 508; 307/117, 252 B; 340/588, 589

[56] References Cited

U.S. PATENT DOCUMENTS

4,461,951  7/1984  Luoma, II et al. ................. 219/497
4,500,775  2/1985  Sangu et al. ........................ 219/497
4,502,043  2/1985  Moore ................................ 340/588

Primary Examiner—M. H. Paschall
Attorney, Agent, or Firm—Fitzpatrick, Cella Harper & Scinto

[57] ABSTRACT

A temperature control apparatus for controlling, e.g., a fixing heater of a copying machine has a fuse resistor connected to the fixing heater through a power relay, a thermistor for detecting the surface temperature of a fixing roller heated by the fixing heater, abnormality timers for counting the ON time of the fixing heater and having different preset counts corresponding to different modes of the copying machine, and a control circuit for disconnecting the fuse resistor when the output from the thermistor indicates overheating or the ON time of the heater exceeds the preset count of the timer. Overheating of the heater is prevented with high reliability.

18 Claims, 6 Drawing Sheets

TEMPERATURE CONTROL APPARATUS FOR DETECTING AN ABNORMALITY IN A HEATER IN A COPYING MACHINE OR THE LIKE

This application is a continuation of application Ser. No. 614,763 filed May 29, 1984, now abandoned.

BACKGROUND OF THE INVENTION

1. Field of the Invention

The present invention relates to a temperature control apparatus for controlling a heater of a copying machine or the like.

2. Description of the Prior Art

In a copying machine or the like, in order to prevent overheating of a heater for a thermal fixer, a temperature fuse is connected in series with the heater. This fuse is arranged in the vicinity of the fixing roller of the thermal fixer. When an abnormal temperature increase near the fixing roller is detected, the fuse is disconnected.

However, this type of circuit arrangement is subject to variations in the disconnection time of the fuse depending upon the initial power-on time, the copying time and the thermal response of the fuse. Especially when a high-power heater is used for the purpose of obtaining good thermal rising characteristics, such variations in the disconnection time of the fuse are enhanced. For this reason, the fixer may be damaged (deformation of the fixing rollers, the separation pawl or the like). In the worst case, the copying machine cannot be used again.

In view of this problem, various abnormality detection measures are conventionally taken including disconnection of a temperature detection element for temperature control (e.g., a thermistor) of a heater, thereby preventing overheating of the heater. However, when overheating of the heater is caused due to short-circuiting of an element such as a triac for directly controlling turn-on/turn-off of the heater or an element constituting a triac trigger circuit, temperature control can only be performed by the temperature fuse described above.

According to another abnormality prevention method, the heater is turned off upon detecting that the heater has been turned on for a time period exceeding a predetermined ON time period. In this case, the predetermined time period over which abnormal conduction is detected is set to be a time period T1 required by the heater to reach the standby temperature (e.g., 180° C.) from ambient temperature. If the heater is turned on for a time period exceeding the time period T1, an abnormality is detected. However, the time period T1 is extremely large as compared to an ON time period T2 in the standby or copying mode. For example, the time period T1 is about 20 sec., while the time period T2 is about 1 to 2 seconds. Therefore, even if an abnormality is detected in the case that the ON state of the heater for a time period exceeds the time period T1, a heater abnormality which is caused in the standby or copying mode remains undetected. Then, the heater temperature rises abnormally, and the apparatus is damaged.

SUMMARY OF THE INVENTION

It is, therefore, an object of the present invention to overcome the above problems.

It is another object of the present invention to provide a state temperature control apparatus.

It is still another object of the present invention to provide a highly reliable temperature control apparatus for controlling a heater temperature.

It is still another object of the present invention to provide a safe copying machine.

It is still another object of the present invention to provide a temperature control apparatus which can guarantee safe protection of a copying machine or the like.

The above and other objects and features of the present invention will become apparent from the following description and appended claims taken in conjunction with the accompanying drawings.

DETAILED DESCRIPTION OF THE PREFERRED EMBODIMENT

The preferred embodiment of the present invention will now be described with reference to the accompanying drawings.

Figure 1:
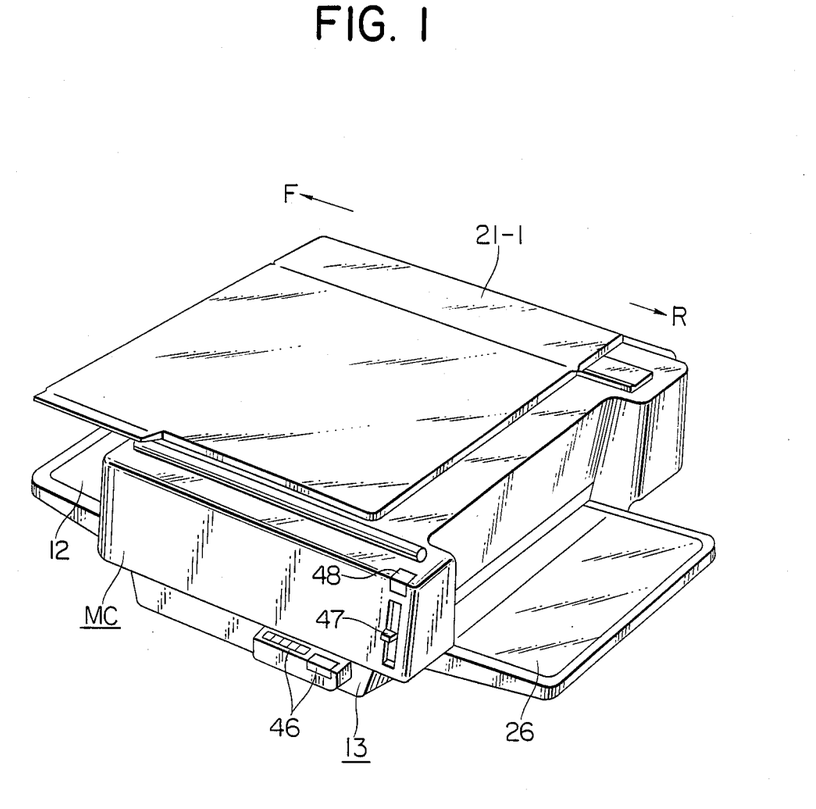
FIG. 1 is a perspective view of a copying machine to which the present invention may be applied.
Figure 2:
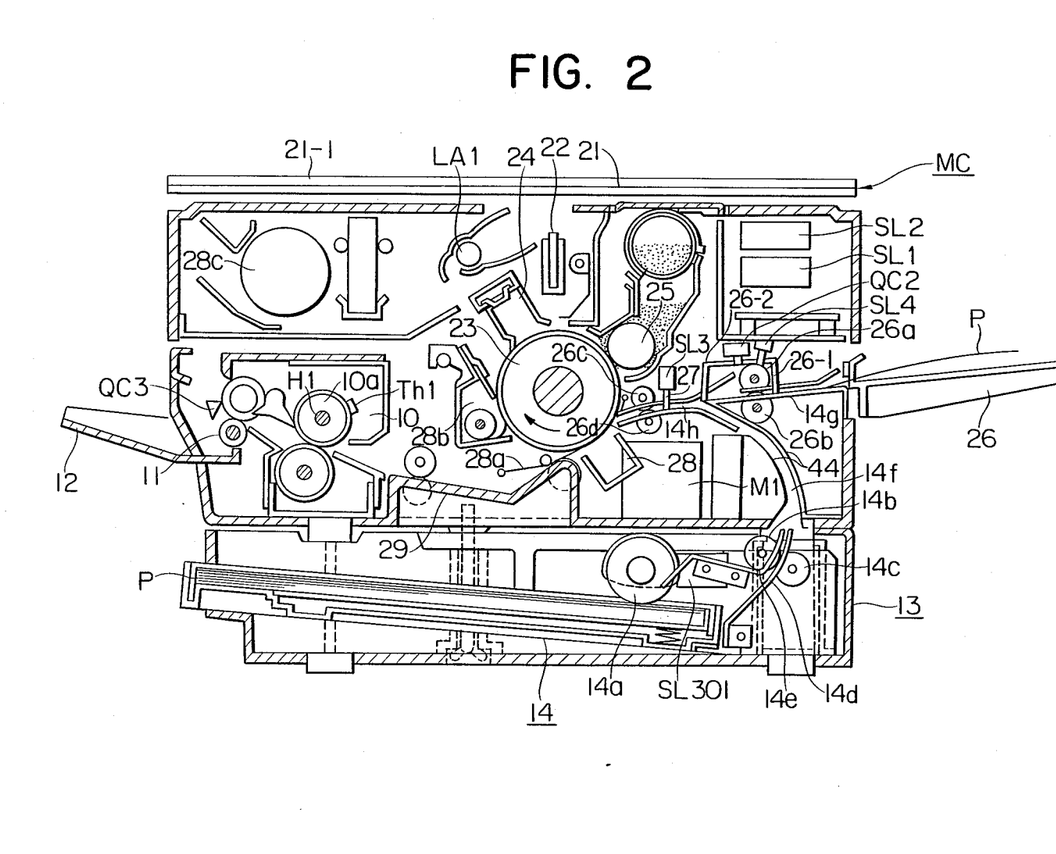
FIG. 2 is a sectional view of the machine shown in FIG. 1.

FIG. 1 is a perspective view of a copying machine to which the present invention can be applied. FIG. 2 shows a sectional view of the same. Referring to FIGS. 1 and 2, a press cover 21-1 is arranged on a transparent table 21 for fixing retaining an original on the table 21. An original table consisting of the table 21 and the press cover 21-1 is moved in the forward direction indicated by arrow F or in the rearward direction indicated by arrow R. An imaging element array 22 of short focal length and small diameter is arranged below the original table. The original placed on the table 21 is illuminated with light from a halogen lamp LA1. The reflected light image returned from the original is slit-exposed by the array 22 onto a seamless photosensitive drum 23. A charger 24 uniformly charges the photosensitive drum 23. The uniformly charged drum 23 is exposed by the array 22 and an electrostatic latent image is formed thereon. The latent image is visualized by a developing unit 25.

A unitary assembly of the seamless photosensitive drum 23, the developing unit 25, and the charger 24 can be mounted onto or demounted from the copying machine main body. A paper feed sensor QC2 is driven by detection arms 26-1 and 26-2 extending near a pickup roller 26a and is turned on by one of these detection arms 26-1 and 26-2 which is moved upward by a transfer sheet P (to be referred to as a sheet P hereinafter) manually fed from a manual feed table 26. When a manual feed solenoid SL4 is biased, the normally rotating pickup roller 26a is moved downward toward a stationary roller 26b. Thus, the sheet P is clamped between the two rollers 26a and 26b and is picked up. A register shutter 27 is located to block a convey path 14h. Thus, the sheet P is stopped when its leading end abuts against the shutter 27. When the sheet P stops in this manner, the paper slips between the rollers 26a and 26b and will not be fed any further. After a short period of time, the manual feed solenoid SL4 is deenergized. After the solenoid SL4 is reenergized, a register signal is applied to a register shutter solenoid SL3. Then, the shutter 27 is moved upward, and the sheet starts to be conveyed again. The sheet is thus conveyed toward the photosensitive drum 23 by rollers 26c and 26d.

The toner image on the photosensitive drum 23 is transferred onto the sheet P by a transfer charger 28. Thereafter, the sheet P separated from the drum 23 by a separation belt 28a is guided to a fixing unit 10 by a guide 29. The toner image on the sheet P is fixed by a fixing roller 10a incorporating a halogen heater as a fixing heater H1. The sheet P is then exhausted onto a tray 12 by an exhaust roller 11.

An exhaust sensor QC3 optically and mechanically detects the sheet P and thereupon generates a detection signal. A thermistor Th1 is incorporated so as to detect the temperature of the fixing roller 10a in the fixing unit 10.

The toner remaining on the drum 23 after transfer is cleaned by a cleaner 28b and used again. A cooling fan 28c is for exhausting heated air inside the copying machine main body to the outside.

A rack (not shown) is fixed to the lower portion of the table 21 in this embodiment. The table 21 is moved in the F or R direction by rotating a pinion meshing with the rack. An original table stop solenoid SL1 controls the rearward movement clutch. An original table forward solenoid SL2 controls a forward movement clutch. Thus, the rotation of a motor M1 is transmitted to the pinion through the forward or rearward movement clutch so as to control the movement of the original table.

The copying machine according to this embodiment has a manual feed apparatus which can feed a single sheet P, one at a time. However, when a number of transfer sheets must be fed for continuous copying, an attachment 13 can be connected below a copying machine main body MC so as to allow continuous sheet feed from a cassette 14.

The attachment 13 has a sheet feed roller 14a controlled by a cassette sheet feed solenoid SL301, and convey rollers 14b and 14c which are normally rotating. A convey path constituted by convey guides 14d and 14e is communicated with a convey path 14f of the copying machine main body MC.

The convey path 14f and a convey path 14g for manual sheet merge into the convey path 14h. The register shutter 27 arranged in the convey path 14h stops the leading end of the transfer sheet P.

An operation panel 46 included in the attachment 13 has a copy start key and an operation/display section. A density control lever 47 and a power source/jam display 48 are incorporated in the copying machine main body MC.

Figure 3:
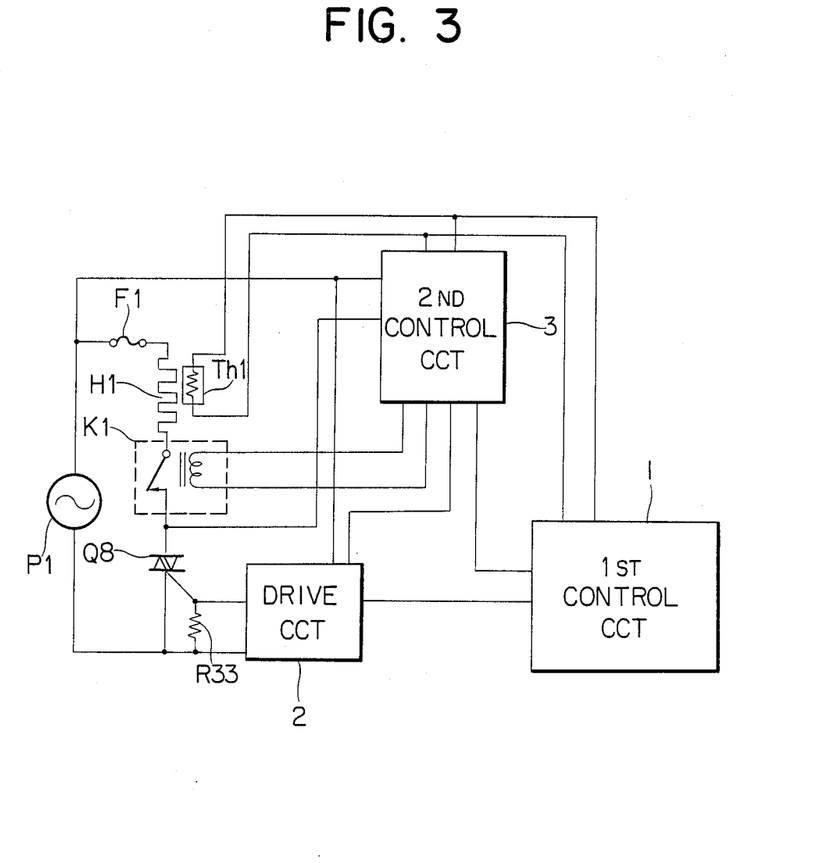
FIG. 3 is a block diagram of a control circuit according to an embodiment of the present invention.
Figure 4:
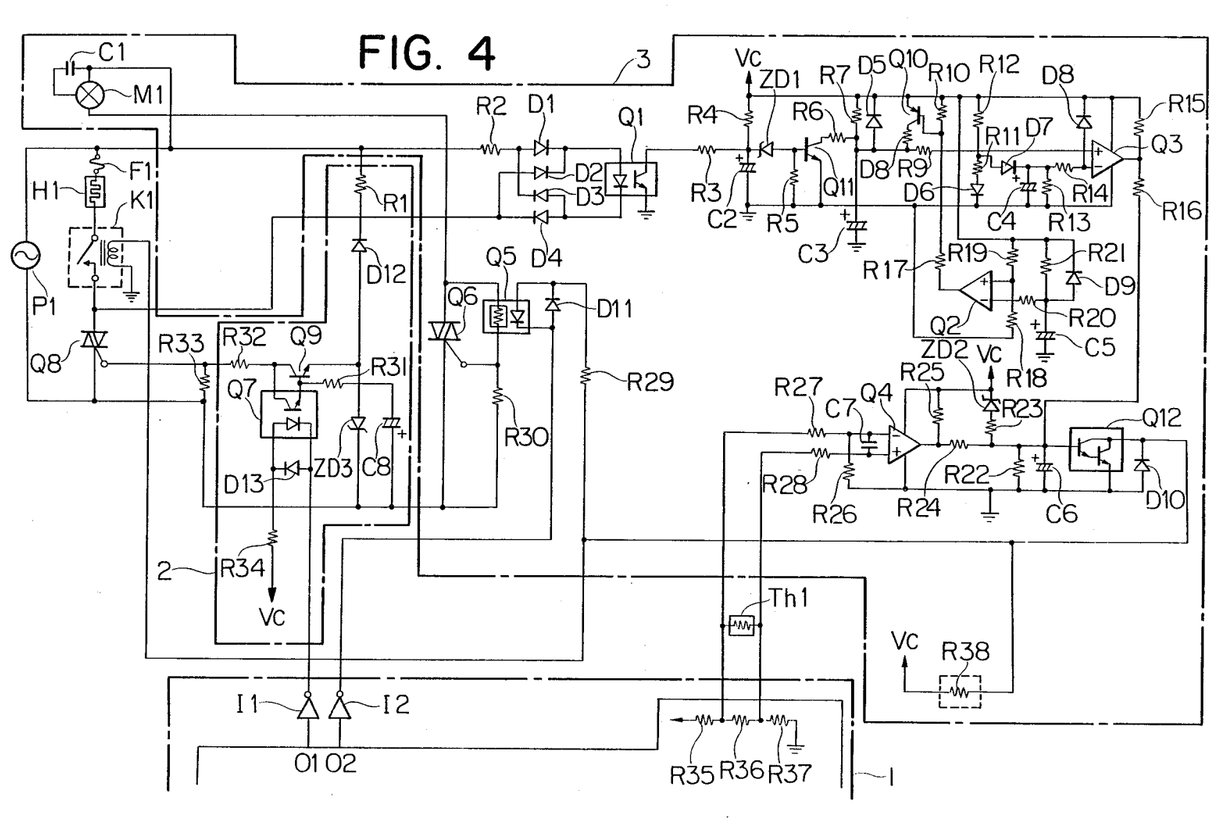
FIG. 4 is a detailed circuit diagram of the control circuit shown in FIG. 3.
Figure 5:
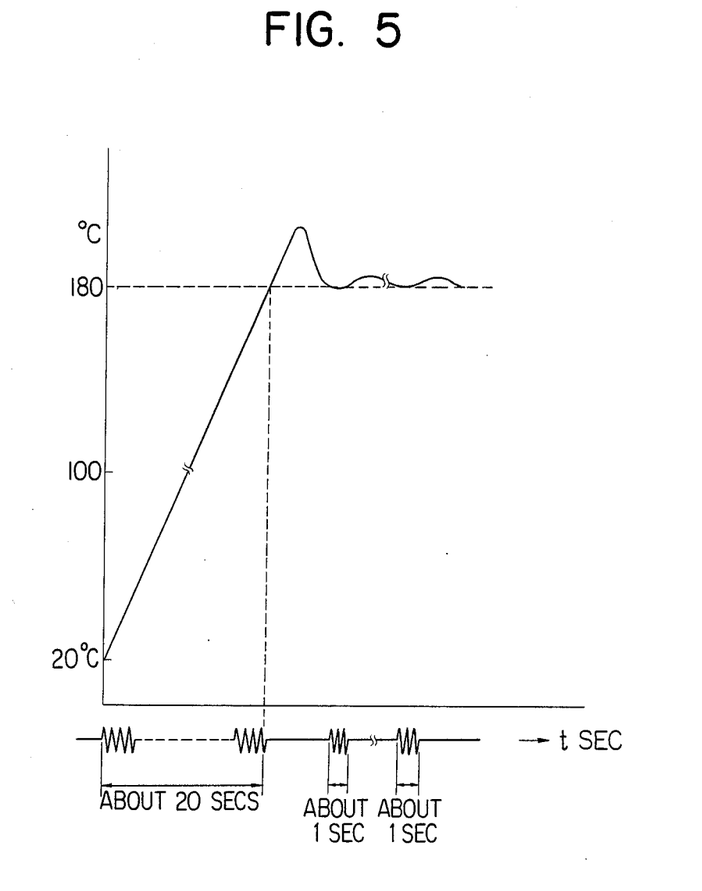
FIG. 5 is a graph showing changes in the surface temperature of a fixing roller as a function of heater ON time in the normal state.

FIG. 3 is a block diagram of a control circuit of the temperature control apparatus according to this embodiment. FIG. 4 is a detailed circuit diagram of this control circuit. The circuit includes a temperature fuse F1, a power relay K1, and triacs Q6 and Q8. The thermistor Th1 detects the surface temperature of the fixing roller heated by the fixing heater H1. A first control circuit 1 controls the open/closed state of the triac Q8 through a triac driver circuit 2 in accordance with a detection result obtained by the thermistor Th1. A second control circuit 3 controls the power relay K1. The circuit further controls photocouplers Q1, Q5 and Q7; comparators Q2 to Q4; resistors R1 to R38; diodes D1 to D13; Zener diodes ZD1 to ZD3; transistors Q9 to Q12; capacitors C1 to C8; inverters I1 and I2; and AC power source P1; and the main motor M1. A power source voltage Vc is 24 V.

The fixing heater H1 is connected to the AC line through the relay K1 and the triac A8. Therefore, the heater H1 is ON when the relay K1 is closed and the triac Q8 is ON.

In this circuit, the contacts of the relay K1 are open before power is turned on. Even after power is turned on, if a current does not flow through the coil of the relay K1, the relay K1 is not set. In other words, when a current flows to the coil of the relay K1 through the power source P1 and the fuse resistor R38, the relay K1 is set. The first control circuit 1 comprises, for example, a microcomputer. In response to a signal from the thermistor Th1 for controlling the surface temperature of the fixing roller, the circuit 1 controls the triac Q8. Since the control operation of the first control circuit 1 is known, a detailed description is omitted.

In this circuit, a safety measure against overheating of the fixing heater H1 in the fixing roller is as follows. That is, the second control circuit 3 which is separate from the first control circuit 1 cuts off the secondary coil of the relay K1 to open the contacts of the relay K1 and thus prevent overheating of the heater H1. In other words, in the circuit of the embodiment, the fuse resistor R38 is used and is disconnected upon occurrence of an abnormality. Therefore, when an abnormality occurs, the relay K1 will not be turned on unless the abnormality is eliminated and the disconnected fuse resistor is replaced with a new one.

The method of detecting overheating of the heater H1 in this embodiment will now be described.

In this circuit, the ON time of the heater H1 is monitored so as to detect an abnormality of the heater H1. An abnormal temperature increase of the fixing roller is detected in response to a signal from the thermistor Th1. The method of detecting an abnormal ON time of the heater H1 will first be described. The ON time of the heater H1 is controlled by different timers in the standby and copying modes. Separate timers are used for the following reason. When the surface of the roller is at ambient temperature (e.g., about 20° C.), it takes about 20 seconds to bring the roller to the fixing temperature in the standby mode (about 180° C.). In the standby or copying mode, it takes about 1 second for the heater to heat the fixing roller to the fixing temperature after the heater H1 is turned off.

When these characteristics are considered, if one timer is used to detect an abnormality of the heater, a difficulty (e.g., overheating of the heater or the like) arises due to a relatively wide range of ON time period required for the heater to heat the roller to the fixing temperature.

In view of this, two timers are used to provide satisfactory temperature control in this embodiment. Abnormal detection of higher precision can be performed if separate timers are used in the standby and copying modes.

The method of detecting an abnormal temperature increase of the roller (heater H1) will be described below. In this circuit, a signal from the thermistor Th1 is detected. When the signal from the thermistor Th1 exceeds a predetermined value, an abnormality is detected.

The method of disconnecting the fuse resistor R38 upon detection of overheating of the heater H1 is described below with reference to the circuit shown in FIG. 4.

(1) Abnormal Temperature Increase

The thermistor Th1 (temperature sensor) is connected to the comparator Q4. Utilizing the characteristics of the thermistor Th1 wherein the resistance is decreased with an increase in temperature, when the fixing roller reaches a predetermined temperature (e.g., 270° C.), an output from the comparator Q4 is set to H level and to turn on the driver Q12. When the driver Q12 is ON, a current exceeding a rated current flows through the fuse resistor R38 and the fuse resistor R38 is disconnected. Thus, when an abnormal temperature increase is detected by the thermistor Th1, the fuse resistor R38 is disconnected and power supply to the heater H1 is stopped.

Figure 6:
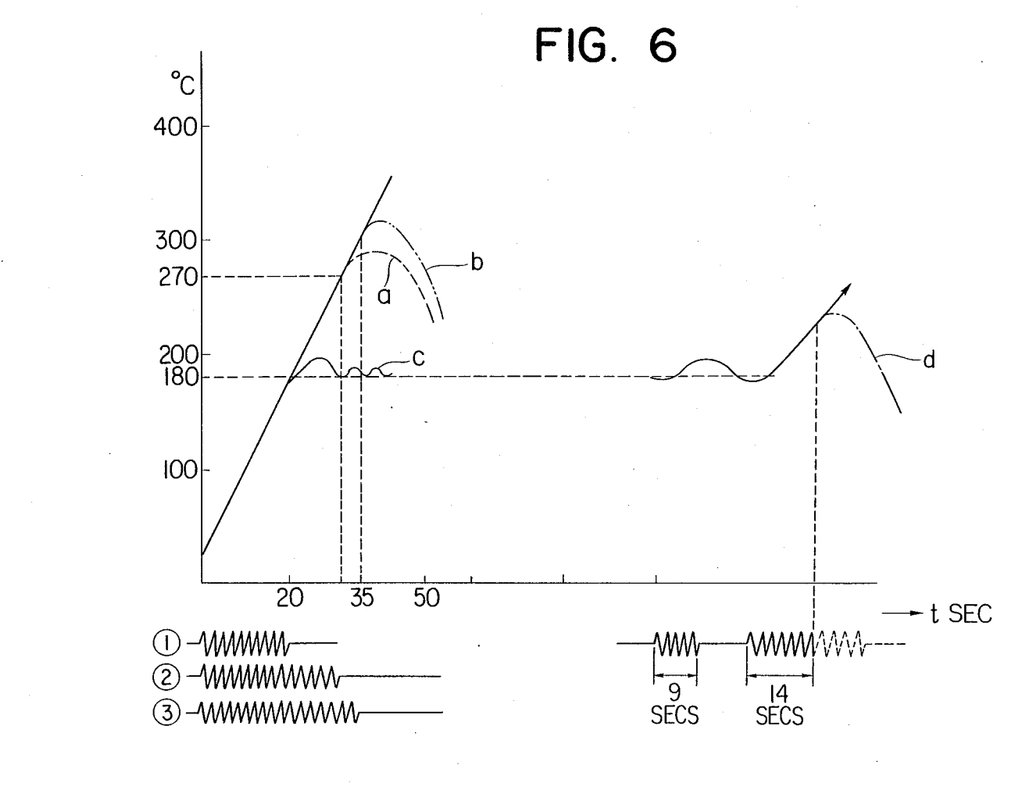
FIG. 6 is a graph showing changes in the surface temperature of the fixing roller as a function of heater ON time in an abnormal state.

This is indicated by broken curve a in FIG. 6. In FIG. 6, time (t) is plotted along the axis of abscissa, and surface temperature (° C.) of the fixing roller is plotted along the axis of ordinate. The heater ON time is indicated by ②.

(2) Abnormal ON Time

When the triac Q8 is ON, a signal obtained across the two ends of a circuit of the temperature fuse F1, the heater H1 and the relay K1 is full-wave rectified by the diodes D1 to D4. The secondary side of the photocoupler Q1 is thus turned on. As a result, the transistor Q11 is turned off and an abnormal timer to be described later is turned on. When the triac Q8 is OFF, no power is supplied to the diodes D1 to D4. Therefore, the secondary side of the photocoupler Q1 is turned off. However, the transistor Q11 is not turned on at the same time as the photocoupler Q1 is turned off. At the secondary side of the photocoupler Q11, the Zener diode ZD1 of a predetermined voltage is connected to the base of the transistor Q11, and the transistor Q11 is turned on after a predetermined time period determined by a time constant of the resistor R4 and the capacitor C2. When the transistor Q11 is turned on, the abnormality timer is reset. The capacitor C2 is charged while the heater H1 is off at the primary side of the photocoupler Q1. The above circuit arrangement is adopted for the following reason. Assume that the transistor Q11 is immediately turned on to reset the abnormality timer when the heater H1 is OFF. Then, if the heater is kept ON for a long period of time after it is turned off for only a short period of time, the heater is overheated. For this reason, if the heater H1 is OFF, the transistor Q11 is turned on only after a predetermined time period (determined by the resistor R4 and the capacitor C2). Thus, even if the heater H1 is turned off, the abnormality timer is reset only after a predetermined time period.

The abnormality timer will now be described.

The collector side of the transistor Q11 consists of two abnormality timers. One abnormality timer consists of the resistor R7 and the capacitor C3. The other abnormality timer consists of a parallel circuit of resistors R7 and R8 and the capacitor C3. Within a predetermined time period after power is turned on, an abnormal ON time is detected by the abnormality timer consisting of the resistor R7 and the capacitor C3. The predetermined time period in this case is a time period (e.g., 45 seconds) for the output from the comparator Q2 to fall to L level from the power ON time. In other words, this predetermined time period is a time period for the output from the timer consisting of the resistor R21 and the capacitor C5 to exceed a reference voltage from the comparator Q2.

After the output from the comparator Q2 falls to L level, the transistor Q10 is turned on. A switch is made to the abnormality timer consisting of the resistors R7 and R8 and the capacitor C3 for abnormality detection. The two abnormality timers are connected to the inverting input terminal of the comparator Q3. When the voltage supplied to this inverting input terminal exceeds the reference voltage supplied to the noninverting input terminal of the comparator Q3, an abnormality is detected and the comparator Q3 produces an output of H level. Then, the transistor Q12 is turned on, and the fuse resistor R38 is disconnected as in the case of an abnormal temperature increase.

The surface temperatures of the roller in the abnormal states described above are represented by alternate long and two short dashed curve b and alternate long and short dashed curve d shown in Fig. 6. The curve b represents the roller temperature when an abnormal ON time after power ON is detected by the first timer (resistor R7 and capacitor C3). In this circuit, an abnormality is detected when the heater is kept ON for a time period exceeding about 35 seconds (indicated by ③) after power is turned on. The state indicated by the curve b represents detection of an abnormal ON time when the abnormal temperature increase is not detected for some reason.

The curve d represents the temperature state of the fixing roller when an abnormal ON time is detected in the standby or copying mode by the second timer (resistors R7 and R8 and capacitor C3). In this circuit, an abnormal ON time is detected when the heater is kept ON for a time period exceeding 14 seconds in the standby or copying mode. Curve C represents the temperature of the fixing roller in the normal state. It can be seen from the curve C that a maximum heater ON time is about 9 seconds in the normal state.

In this manner, the circuit of the present invention includes the second control circuit for monitoring the heater state in addition to the first control circuit for controlling the heater in accordance with the detection result of the thermistor Th1. Therefore, even if the first control circuit operates erroneously or the triac Q8 or the triac driver circuit 2 becomes abnormal, safety of the apparatus can be guaranteed by the second control circuit.

In this circuit, since the abnormal temperature increase and the abnormal ON time are detected simultaneously, the abnormal state of the heater can be constantly detected.

Although the power relay K1 is used in the above embodiment, other switching means such as a triac or a thyristor can alternatively be used.

A fuse or a breaker can be used in place of the fuse resistor R38. The second control circuit 3 can comprise a microcomputer so as to detect an abnormal temperature increase and an abnormal ON time independently of the first control circuit. The timer times and the abnormality detection temperatures defined above can be determined in accordance with individual cases. Furthermore, the temperature when power is turned on can be detected and the abnormality timer after power ON can be switched in accordance with the detected temperature.

Thus, the present invention can provide a safe temperature control apparatus. The apparatus of the present invention can prevent any damage to a copying machine or the like due to overheating. The apparatus to be controlled by the temperature control apparatus of the present invention is not limited to a copying machine but may be extended to any apparatus which demands high safety and reliability.

The present invention is not limited to the particular embodiment described above, and various other changes and modifications may be made within the spirit and scope of the appended claims.

What we claim is:

1. A temperature control apparatus comprising:
   heater means;
   temperature detecting means for detecting a temperature of said heater means;
   control means for controlling power supply to said heater means in accordance with an output from said temperature detecting means so as to regulate the temperature of said heater means at a predetermined level; and
   abnormality detecting means for detecting an abnormality of said heater means by measuring an ON time of said heater means, said abnormality detecting means being provided independently of said control means and having first and second timer means for measuring the ON time of said heater means,
   wherein said abnormality detecting means detects an abnormality of said heater means by selecting said first timer means or said second timer means in accordance with a state of said apparatus so as to vary a time period for measuring the ON time of the heater means.

2. An apparatus according to claim 1, further comprising means for disconnecting power supply to said heater means in accordance with a detection output from said abnormality detecting means.

3. An apparatus according to claim 1, further comprising abnormal temperature increase detecting means for detecting an abnormal temperature increase of said heater means in accordance with a detection output from said temperature detecting means, wherein said abnormal temperature increase detecting means is provided independently of said control means.

4. An apparatus according to claim 2, further comprising abnormal temperature increase detecting means for detecting an abnormal temperature increase of said heater means in accordance with a detection output from said temperature detecting means, wherein said disconnecting means disconnects the power supply to said heater means in accordance with a detection output from said abnormal temperature increase detecting means.

5. An apparatus according to claim 1, further comprising third timer means for measuring a predetermine time, wherein said abnormality detecting means uses said first timer means until the predetermined time passes after said apparatus is turned ON, and uses said second timer means after the predetermined time passes.

6. An apparatus according to claim 5, wherein said first timer means measures a first time period which is longer than a second time period measured by said second timer means.

7. A temperature control apparatus comprising:
   heater means;
   temperature detecting means for detecting a temperature of said heater means;
   control means for controlling power supply to said heater means in accordance with an output from said temperature detecting means so as to regulate a temperature of said heater means to a predetermined level;
   abnormality detecting means for detecting an abnormality of said heater means by measuring an ON time of said heater means, said abnormality detecting means measuring an ON time of said heater means regardless of a temperature of said heating means, and for determining an abnormality of said heater means when the ON time exceeds a predetermined period; and
   abnormality temperature increase detecting means for detecting an abnormal temperature increase of said heater means, regardless of the ON time of said heater means, in accordance with a detection output from said temperature detecting means;
   wherein said abnormality detecting means and said abnormal temperature increase detecting means are provided independently of said control means.

8. An apparatus according to claim 7, further comprising disconnecting means for disconnecting power supply to said heater means in accordance with an output from one of said abnormality detecting means and abnormal temperature increase detecting means.

9. An apparatus according to claim 7, wherein said abnormality detecting means includes first and second timer means for measuring the ON time of said heater means and detects an abnormality of said heater means by selecting said first timer means or said second timer means in accordance with a state of said apparatus so as to vary a period of time for measuring the ON time of said heater means.

10. An apparatus according to claim 9, further comprising third timer means for measuring a predetermined time, wherein said abnormality detecting means uses said first timer means until the predetermined time passes after said apparatus is turned ON and uses said second timer means after the predetermined time passes.

11. A temperature control apparatus comprising:
    heater means;
    temperature detecting means for detecting a temperature of said heater means;
    a microcomputer for controlling power supply to said heater means in accordance with an output from said temperature detecting means so as to regulate a temperature of said heater means at a predetermined level; and
    abnormality detecting means for detecting an abnormality of said heater means by measuring an ON time of said heater means, said abnormality detecting means being provided independently of said microcomputer;
    wherein said abnormality detecting means includes means for measuring an ON time of said heater means, regardless of a temperature of said heater means, and determines an abnormality of said heater means when the ON time measured by said measuring means exceeds a predetermined period.

12. An apparatus according to claim 11, further comprising means for disconnecting power supply to said heater means in accordance with a detection output from said abnormality detecting means.

13. An apparatus according to claim 11, further comprising abnormal temperature increase detecting means for detecting an abnormal temperature increase of said heater means, regardless of the ON time of said heater means, in accordance with a detection output from said temperature detecting means, said abnormal temperature increase detecting means being provided independently of said microcomputer.

14. An apparatus according to claim 11, wherein said timer means includes first and second timer circuits for measuring an ON time of said heater means, and said abnormality detecting means detects an abnormality of said heater means by selecting said first timer circuit of said second timer circuit in accordance with a state of said apparatus so as to vary a period of time for measuring the ON time of said heater means.

15. An apparatus according to claim 14, further comprising third timer means for measuring a predetermine time, wherein said abnormality detecting means uses said first timer means until the predetermined time passes after said apparatus is turned ON, and uses said second timer means after the predetermined time passes.

16. A temperature control apparatus measuring
heater means;
temperature detecting means for detecting a temperature of said heater means;
control means for controlling power supply to said heater means in accordance with an output from said temperature detecting means so as to regulate a temperature of said heater means to a predetermined level;
abnormality detecting means for detecting an abnormality of said heater means by comparing an ON time of said heater means; and
abnormal temperature increase detecting means for detecting an abnormal temperature increase of said heater means in accordance with a detection output from said temperature detecting means;
wherein said abnormality detecting means has timer means for measuring said ON time of said heater means and reset means for resetting said timer means, said reset means resetting said timer means after the lapse of a predetermined time period when said heater means is turned off.

17. A temperature control apparatus comprising:
heater means;
temperature detecting means for detecting a temperature of said heater means;
a microcomputer for controlling power supply to said heater means in accordance with an output from said temperature detecting means so as to regulate a temperature of said heater means at a predetermined level; and
abnormality detecting means for detecting an abnormality of said heater means by measuring an ON time of said heater means, said abnormality detecting means being provided independently of said microcomputer;
wherein said abnormality detecting means has timer means for measuring said ON time of said heater means and reset means for resetting said timer means, said reset means resetting said timer means after the lapse of a predetermined time period when said heater means is turned off.

18. A temperature control apparatus comprising:
heater means;
temperature detecting means for detecting a temperature of said heater means;
control means for controlling power supply to said heater means in accordance with an output from said temperature detecting means so as to regulate the temperature of said heater means at a predetermined level; and
abnormality detecting means for detecting an abnormality of said heater means by measuring an ON time of said heater means, said abnormality detecting means being provided independently of said control means,
said abnormality detecting means having a plurality of modes and measuring the ON time in accordance with each of the plurality of modes;
wherein said abnormality detecting means has timer means for measuring said ON time of said heater means and reset means for resetting said timer means, said reset means resetting said timer means after the lapse of a predetermined time period when said heater means is turned off.

* * * * *

UNITED STATES PATENT AND TRADEMARK OFFICE
CERTIFICATE OF CORRECTION

PATENT NO. : 4,740,671
DATED : April 26, 1988
INVENTOR(S) : KOUKI KURODA, ET AL.

It is certified that error appears in the above-identified patent and that said Letters Patent is hereby corrected as shown below:

Column 2, line 40, "fixing" should be deleted.

Column 9, line 13, "of" should be --or--;

line 33, "comparing" should be --measuring--.

Signed and Sealed this

Sixteenth Day of August, 1988

Attest:

DONALD J. QUIGG

Attesting Officer

Commissioner of Patents and Trademarks